United States Patent
Park et al.

(10) Patent No.: US 9,229,503 B2
(45) Date of Patent: Jan. 5, 2016

(54) THERMAL POWER BUDGET ALLOCATION FOR MAXIMUM USER EXPERIENCE

(71) Applicant: QUALCOMM Incorporated, San Diego, CA (US)

(72) Inventors: Hee Jun Park, San Diego, CA (US); Ronald Alton, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 375 days.

(21) Appl. No.: 13/686,730

(22) Filed: Nov. 27, 2012

(65) Prior Publication Data

US 2014/0149753 A1 May 29, 2014

(51) Int. Cl.
G06F 1/26 (2006.01)
G06F 1/32 (2006.01)
G06F 1/20 (2006.01)

(52) U.S. Cl.
CPC *G06F 1/26* (2013.01); *G06F 1/206* (2013.01); *G06F 1/324* (2013.01); *G06F 1/325* (2013.01); *G06F 1/3206* (2013.01); *G06F 1/3265* (2013.01); *G06F 1/3278* (2013.01); *Y02B 60/126* (2013.01); *Y02B 60/1214* (2013.01); *Y02B 60/1217* (2013.01); *Y02B 60/1242* (2013.01); *Y02B 60/1275* (2013.01)

(58) Field of Classification Search
CPC .................................................. G06F 1/3234
USPC .......................................................... 713/324
See application file for complete search history.

(56) References Cited

U.S. PATENT DOCUMENTS

| | | | |
|---|---|---|---|
| 6,516,418 B1 * | 2/2003 | Lee | 713/320 |
| 6,587,953 B1 * | 7/2003 | Torikai | 713/330 |
| 6,885,974 B2 * | 4/2005 | Holle | 702/182 |
| 7,260,728 B2 | 8/2007 | Chang et al. | |
| 7,788,516 B2 | 8/2010 | Conroy et al. | |
| 8,001,407 B2 | 8/2011 | Malone et al. | |
| 2003/0056126 A1 * | 3/2003 | O'Connor et al. | 713/300 |
| 2003/0084359 A1 * | 5/2003 | Bresniker et al. | 713/324 |
| 2003/0158609 A1 | 8/2003 | Chiu | |
| 2006/0190745 A1 * | 8/2006 | Matsushima et al. | 713/300 |
| 2007/0180280 A1 * | 8/2007 | Bolan et al. | 713/300 |
| 2008/0283599 A1 * | 11/2008 | Rasband et al. | 235/439 |
| 2009/0125737 A1 * | 5/2009 | Brey et al. | 713/322 |
| 2010/0146308 A1 * | 6/2010 | Gioscia et al. | 713/300 |
| 2010/0268930 A1 * | 10/2010 | Bose et al. | 713/100 |
| 2011/0019625 A1 * | 1/2011 | Zhang et al. | 370/329 |
| 2011/0055596 A1 | 3/2011 | Wyatt | |
| 2014/0136858 A1 * | 5/2014 | Jacobson et al. | 713/300 |
| 2014/0143558 A1 * | 5/2014 | Kuesel et al. | 713/300 |

OTHER PUBLICATIONS

Wikipedia, "Derivative", Jun. 10, 2012.*

* cited by examiner

*Primary Examiner* — Jaweed A Abbaszadeh
*Assistant Examiner* — Cheri Harrington
(74) *Attorney, Agent, or Firm* — Howard Seo

(57) ABSTRACT

A method, an apparatus, and a computer program product for allocating a total power budget among a plurality of components of a user device are provided. The apparatus prioritizes the plurality of components based on a user experience model (performance/power model) for each of the plurality of components. The user experience model (performance/power model) of a component includes a measure of component attribute as a function of component power consumption. The apparatus allocates portions of the total power budget among the user-device components based on priority established by the user experience model. The apparatus may further prioritize the components based on weights assigned to the components.

37 Claims, 9 Drawing Sheets

THERMAL POWER BUDGET ALLOCATION FOR MAXIMUM USER EXPERIENCE

BACKGROUND

1. Field

The present disclosure relates generally to power control systems, and more particularly, to a power supply controller for allocating portions of a total thermal budget among components of a user device.

2. Background

User devices, e.g., Smartphones, tablets, laptops, etc., includes many components, such as a display, battery charger, RF transmitter/modem, central processing unit (CPU), graphics processing unit (GPU) and speaker that provide high performance features. Such features include, for example, quadcore, high resolution/brightness displays, LTE communications, 3D graphics. As the number of device features and corresponding components increase the overall thermal output of the device increase and the electrical current demand increases. Such increases may be sustainable for brief periods of time, e.g., 5-10 minutes. Beyond that time, however, operation of a device cannot be safely maintained.

Inadequate thermal cooling capability and current supply capability of such devices, particularly small scale devices with small form factors, such as Smartphones, may be detrimental to the operation of the device and thus, user's experience with the device. Furthermore, inadequate thermal cooling may not only effect the operation of the device, it may affect device longevity as well.

With respect to thermal cooling, conventional devices employ simple algorithms to limit thermal power (heat generation) and battery current. FIG. 1 is a diagram illustrating a conventional device 100, wherein a look-up table 102 is used to adjust component clock speed as a function of temperature. A multi-core processor 104 consumes an amount of power based on the frequency of operation of the processor ($P_{processor}$). During operation of the processor 104 some power is converted to heat. A delay 106 obtains a measure of such heat as a temperature. The temperature may be a junction temperature ($T_j$), which corresponds to the temperature of silicone dye in the chip transistors within the user device, or it may be a case or skin temperature ($T_{case}$), which corresponds to a temperature of the surface of the user device case or housing. This temperature is fed back to a thermal mitigation element 108. Using the look-up table 102, the mitigation element 108 determines a core-processor frequency limit ($F_{limit}$) of operation for the processor 104 based on the temperature, and outputs the frequency limit to the processor.

Thus, in conventional systems, if the temperature of a particular component, e.g., processor, is too high, an operational aspect of that component may be throttled. In the case of a CPU or GPU, its frequency may be throttled. If the device is still too hot, additional components may be throttled. Such thermal power algorithms focus on local control of CPU/GPU temperature/power. These algorithms do not consider the quantified system-level power budget available and system overall performance as function of user experience. Nor do they provide global thermal power budget allocation to each of the components in a user device. For example, these algorithms are not scalable for various components, e.g., CPU, GPU, modem, RF, display, charger, memory, etc., inside the user device. They also do not take into consideration dynamic priority changes for each component depending on device usage scenarios. As such, conventional power control algorithms do not have the framework to optimize the overall 'user experience' based on particular users and usage scenarios.

Each component of a user device has unique power requirements. As the usage of each component, and thus the power requirements, may be different under different usage scenarios, it would be beneficial to allocate a total power budget based on component priorities and device usage scenarios.

SUMMARY

In an aspect of the disclosure, a method, an apparatus, and a computer program product for allocating a total power budget among a plurality of components of a user device are provided. The apparatus prioritizes the plurality of components based on a user experience model (performance/power model) for each of the plurality of components. The user experience model (performance/power model) of a component includes a measure of component attribute as a function of component power consumption. The apparatus allocates portions of the total power budget among the user-device components based on priority. The apparatus may further prioritize the components based on weights assigned to the components.

DETAILED DESCRIPTION

Figure 1:
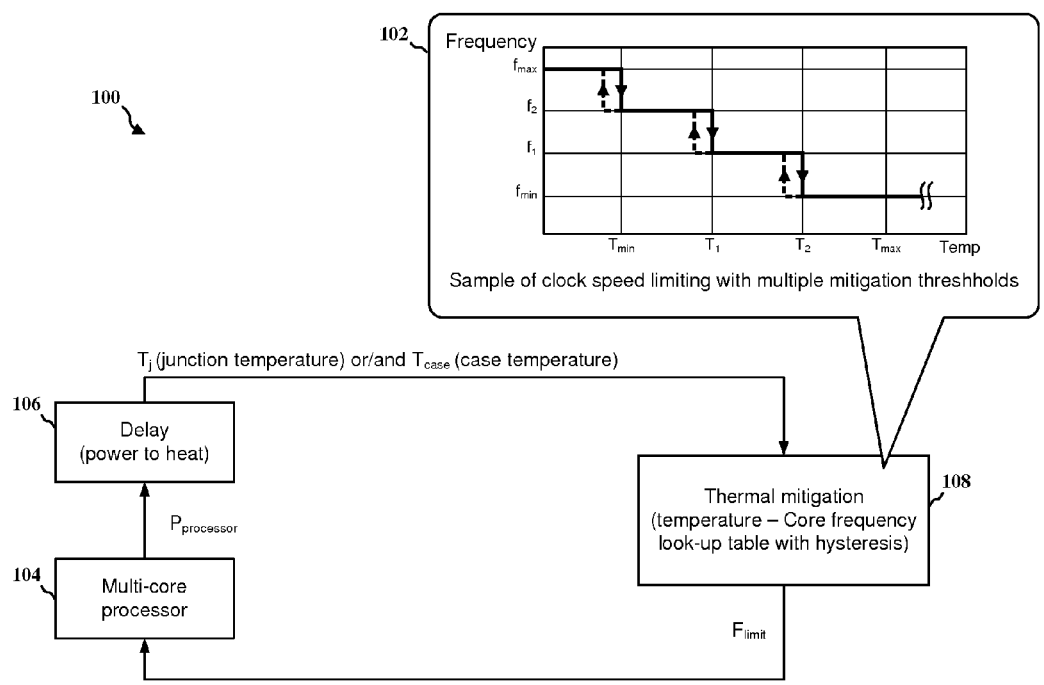
FIG. 1 is a diagram illustrating a conventional power control system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of power control systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Figure 2:
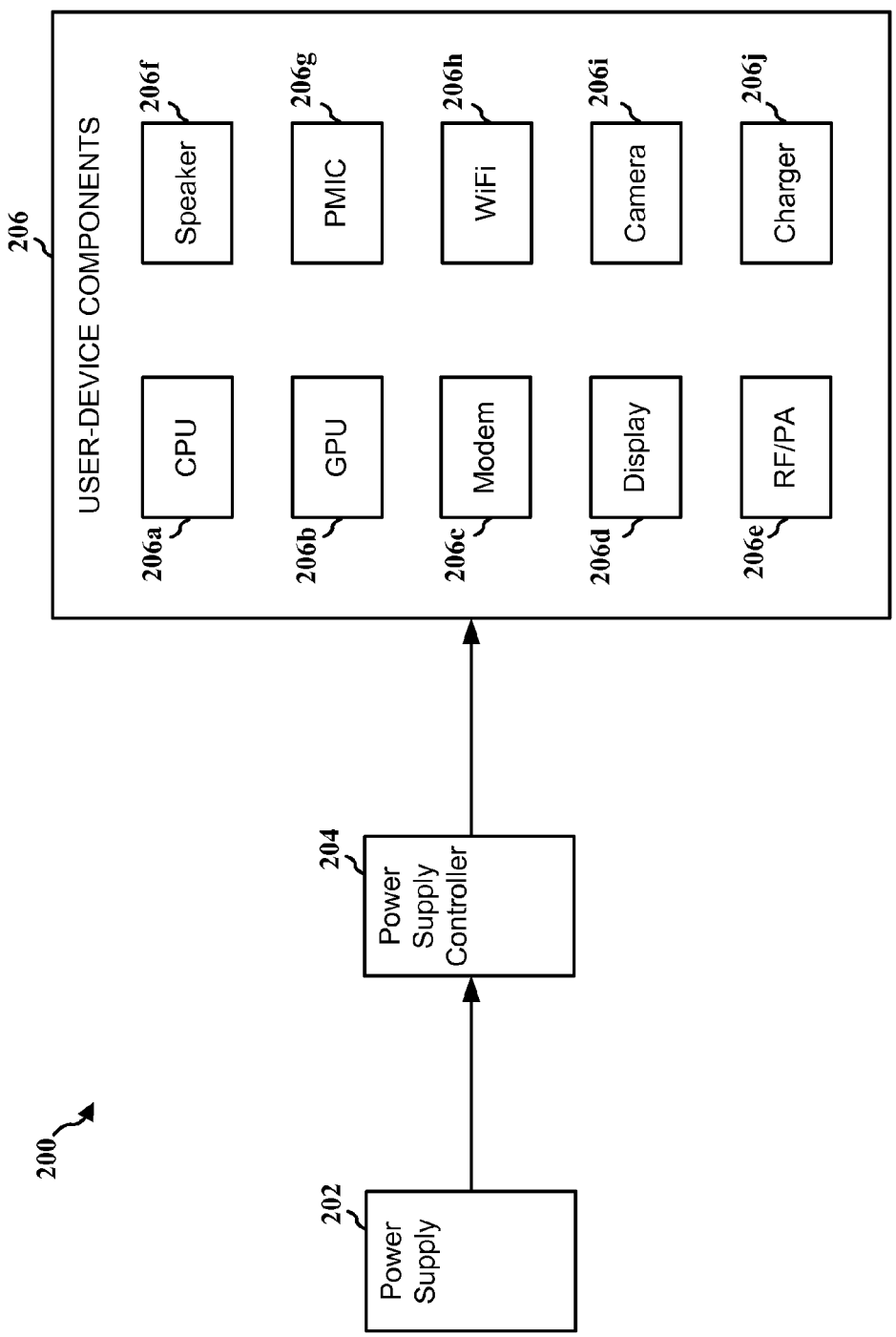
FIG. 2 is a diagram illustrating a user device with a power control system for controlling power to various user-device components.

FIG. 2 is a diagram illustrating a user device 200 with a power supply controller 204 for controlling power to various user-device components 206. The user device 200 may be a Smartphone, tablet, laptop or other device that provides high performance features, such as voice and data communications, 3D graphics processing and high definition display. The user device 200 includes a power supply 202 that supplies power for the various user-device components 206 and a power supply controller 204 that controls the distribution of power to the components. The user-device components may include: a CPU 206a, a GPU 206b, a modem 206c, a display 206d, a RF/PA 206e, an audio output, e.g., speaker, 206f, a PMIC 206g, a Wi-Fi radio 206h, a camera 206i and battery charger 206j. As described below, the power supply controller 204 allocates power to the components 206 based in part on performance/power models corresponding to one or more of the user-device components, and optionally, further based on weights assigned to the components.

Figure 3:
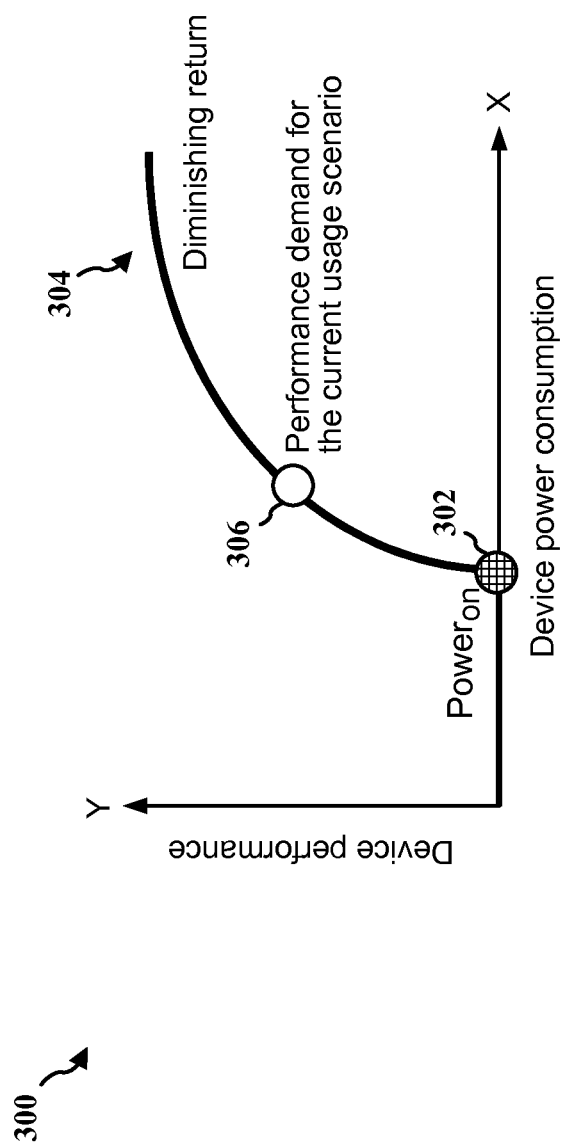
FIG. 3 is a graph illustrating a performance/power model for a user-device component.
Figure 4:
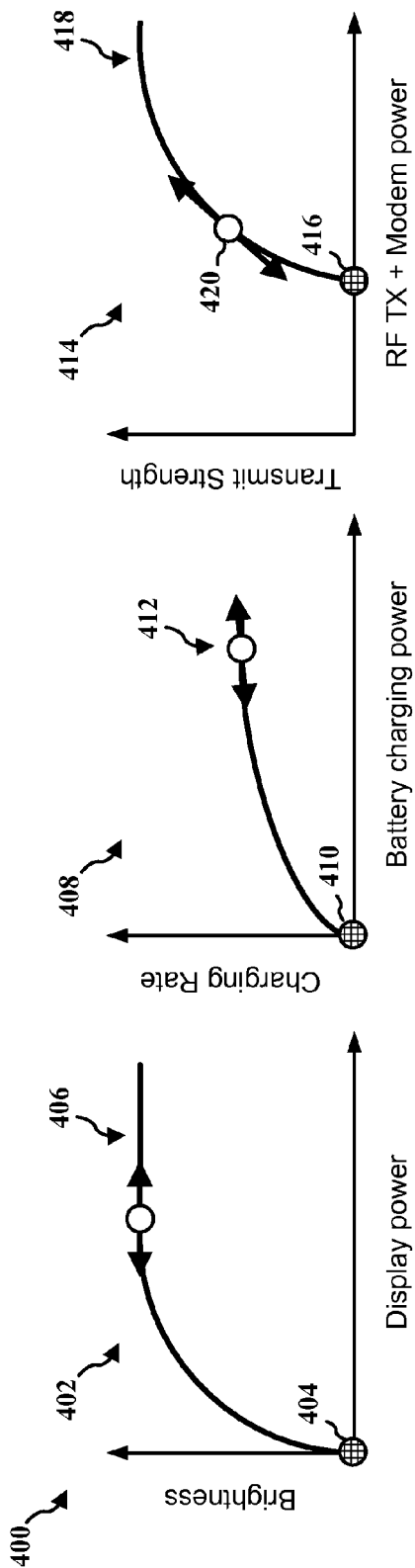
FIGS. 4A-4F are graphs illustrating performance/power models for exemplary user-device components.

FIG. 3 is a graph illustrating a performance/power model 300 for a user-device component. The x-axis of the model represents component power consumption. The y-axis of the model represents component performance, where performance corresponds to a measureable attribute or parameter of the component. For example, in the case of a CPU component, the performance attribute may be frequency. In the case of a display component, the performance attribute may be brightness. The models may be generated experimentally by plotting measures of the component parameter at varying power consumption levels.

A performance/power model 300 includes a "power-on" point 302 corresponding to a minimum level of power consumption needed for the device to initiate operation. In general terms, most performance/power models exhibit increased performance as power consumption is increased. Some models, however, exhibit a point or region of diminishing return 304, where the slopes of the models tend to approach zero and flatten out. Beyond the point of diminishing return 304, an increase in power does not produce an increase in performance. Likewise, in the region of diminishing return a decrease in power does not necessarily produce a decrease in performance. Other regions of the models exhibit varying slopes as power increases, with regions of steeper slopes corresponding to a higher return on investment of power resources. In other words, in steep slope regions the component experiences a significant increase in component performance for minimal power increase.

A feature of the power supply controller 204 is to allocate portions or units of the power allocation budget among a number of components based on a measure, e.g., slope, of the performance/power model in view of the current power consumption of the component. For example, if the present power consumption of the device of FIG. 3 is at the power-on point 302, expenditure of one or more units of the power budget, for example, to point 306 will result in a significant increase in device performance. Thus, if power units are available, the controller may chose to allocate a portion of the remaining power budget to the component to increase component performance. Past point 306, however, the performance/power model approaches the region of diminishing return 304 where any increase is component performance is limited or zero. Thus, for components having current power consumption in this region, the power supply controller 204 may choose not to allocate additional power units to the component. Conversely, the power supply controller 204 may choose to de-allocate power to the component operating in the region of diminishing return with knowledge that such reduction will not negatively impact component performance.

The performance/power models may be characterized by the following exemplary equation:

$$\text{Performance}_i = C_1 \times (1 - e^{-C_2 \times (\text{Power}_i - \text{Power}_{on})}) \qquad \text{Eq. 1}$$

where:

$C_1$ = a first constant, $C_2$ = a second constant,

Power-on = the minimum power at which component "i" turns on, $\text{Power}_i$ = the active power consumption of component "i" in addition to power-on.

A slope provides a measure of the performance/power relation and may be characterized by:

$$\frac{d(\text{Performance})_i}{d(\text{Power})_i} \qquad \text{Eq. 2}$$

where "d" corresponds to a delta, i.e., change, in component performance along the y-axis, or in power consumption along the x-axis.

Processing functions of the power supply controller 204 use these equations, or other equivalent or similar equations, to obtain measures of component performance/power.

FIGS. 4A-4F are diagrams illustrating performance/power models for several user-device components. As described above, each performance/power model is a measure of a component attribute or parameter as a function of power consumption by the component.

FIG. 4A is a performance/power model 402 for a display. The display component attribute is brightness (Nits). This model shows a power-on point 404 at which the display initiates operation. As display power consumption increases, the brightness output of the display increases up to a region of diminishing return 406. In the region of diminishing return 406, any increase in brightness as a function of increasing power is minimal or nonexistent. This is represented by the flattening out of the performance/power model 402 in the region of diminishing return 406, where the slope of the model approaches or is equal to zero.

FIG. 4B is a performance/power model 408 for a battery charger. The battery charger component attribute is charging rate measured in amperes (A) per second. This model shows a power-on point 410 at which the charger initiates operation. As the power consumption of the charger increases, the charging rate increases up to a region of diminishing return 412. In the region of diminishing return 412, any increase in charging rate as a function of increasing power is minimal or nonexistent. This is represented by the flattening out of the performance/power model 408 in the region of diminishing return 412, where the slope of the model approaches or is equal to zero.

FIG. 4C is a performance/power model 414 for a RF transmitter/modem. The RF transmitter/modem component attribute is transmit strength, measured in decibel-milliwatts (dBm). This model shows a power-on point 416 at which the RF transmitter/modem initiates operation. The power-on point 416 for this component is somewhat greater than the minimum power-on points 404, 410 of the display and battery charger, and may for example be 25 mW. As the power consumption of the RF transmitter/modem increases, the amount of transmit strength increases up to a region of diminishing return 418. In the region of diminishing return 418, any increase in transmit strength as a function of increasing power is minimal or nonexistent. This is represented by the flattening out of the performance/power model 414 in the region of diminishing return 418, where the slope of the model approaches or is equal to zero. Leading up to the region of diminishing return 418, the performance of the RF transmitter/modem increases significantly with minimal increase in power consumption. Significant performance increases are represented in the performance/power model 414 by regions of steep slopes, for example at point 420, where changes in transmit strength are significantly greater than changes in power consumption.

FIG. 4D is a performance/power model 422 for a CPU. The CPU component attribute is operational frequency measured in gigahertz (GHz). This model shows a power-on point 424 at which the CPU initiates operation. The power-on point 424 for this component is somewhat greater than the minimum power-on points 404, 410 of the display and battery charger, and may for example be 460 mW. As the power consumption of the CPU increases, the CPU operation frequency increases up to a region of diminishing return 426. In the region of diminishing return 426, any increase in operation frequency as a function of increasing power is minimal or nonexistent. This is represented by the flattening out of the performance/power model 422 in the region of diminishing return 426.

FIG. 4E is a performance/power model 428 for a GPU. The GPU component attribute is throughput measured in pixels per second (Pps). This model shows a power-on point 430 at which the GPU initiates operation. The power-on point 430 in this case is somewhat greater than the minimum power-on points 404, 410 of the display and battery charger, and may for example be 140 mW. As the power consumption of the GPU increases, the throughput increases up to a region of diminishing return 432. In the region of diminishing return 432, any increase in throughput as a function of increasing power is minimal or nonexistent. This is represented by the flattening out of the performance/power model 428 in the region of diminishing return 432. Leading up to the region of diminishing return 432, the performance of the GPU increases significantly with minimal increase in power consumption. Significant performance increases are represented in the performance/power model 428 by regions of steep slopes, for example at point 434, where changes in throughput are significantly greater than changes in power consumption.

FIG. 4F is a performance/power model 436 for an audio output. The audio output component attribute is sound volume measured in decibels (dB). This model shows a power-on point 438 at which the audio output initiates operation. As the power consumption of the audio output increases, the sound volume increases up to a region of diminishing return 440. In the region of diminishing return 440, any increase in sound volume as a function of increasing power is minimal or nonexistent. This is represented by the flattening out of the performance/power model 436 in the region of diminishing return 440. Leading up to the region of diminishing return 440, the performance of the audio output increases significantly with minimal increase in power consumption. Significant performance increases are represented in the performance/power model 436 by regions of steep slopes, for example at point 442, where changes in volume are significantly greater than changes in power consumption.

The performance/power models, particularly their slopes, provide measures beneficial to power budget allocation. For a given component, the slope of the model at a particular power consumption level indicates whether allocation of additional power to the component would be beneficial. If the slope is large, relative to the slope of the model in other regions, then allocating additional power to that component to achieve the particular power level would result in a significant component performance improvement for minimal power allocation. This is considered a good return on investment of allocated power. In other regions, however, where the slope is shallow or flat, there would be little if any component performance improvement so allocation of additional power would not result in a good return on investment.

Among a group of components, the slopes of the respective performance/power models may be compared. For example, if one unit of additional power is available for allocation, the slope of each component's performance/power model at one power unit above its current power consumption level would be compared against slopes of other components. The component having the steepest slope at its corresponding new power level, i.e., its current power level plus one additional power unit, would represent the greatest return on investment and would be allocated the additional power unit over the other components.

In another arrangement, component selection may be based on factors in addition to greatest return on investment based on performance/power models. For example, some devices may have associated usage scenarios, under which components are further prioritized through weight associations. In general, higher weights are assigned to components that are used more often. Weighting for devices may be either static or dynamic. Dynamic weights may involve training the power supply controller based on a user's component usage frequency. In this case, component usage is monitored over a period of time and higher weights are assigned to components that are used more frequently.

Dynamic weights may also be based on components usage patterns/context recognition. In this case, component usage is monitored over a period of days to establish patterns of usage throughout the day. Components weights are adjusted throughout the day based on the patterns. For example, component usage during working hours may weigh heavily toward the CPU and modem, for data processing; whereas component usage during non-working hours may weigh heavily toward the GPU, for entertainment purposes. Dynamic weights may also be based on present location or movement of the system as determined based on, for example, GPS data. In this case, for example, if a location places the user device at the user's office, the CPU and modem may be weighted more heavily; whereas for placement at the user's home, the GPU may be weighted more heavily.

Static weights may be set based on manual user settings indicating which components are most important to them. For example, if a user plays video games a lot, then the GPU may be weighted more heavily than the other components. Such setting may be provided for through a device user interface. Static weights may also be set based on permanent original equipment manufacturer (OEM) settings. For example, an OEM may optimize a version of a Smartphone for gamers and another version for the office.

Figure 5:
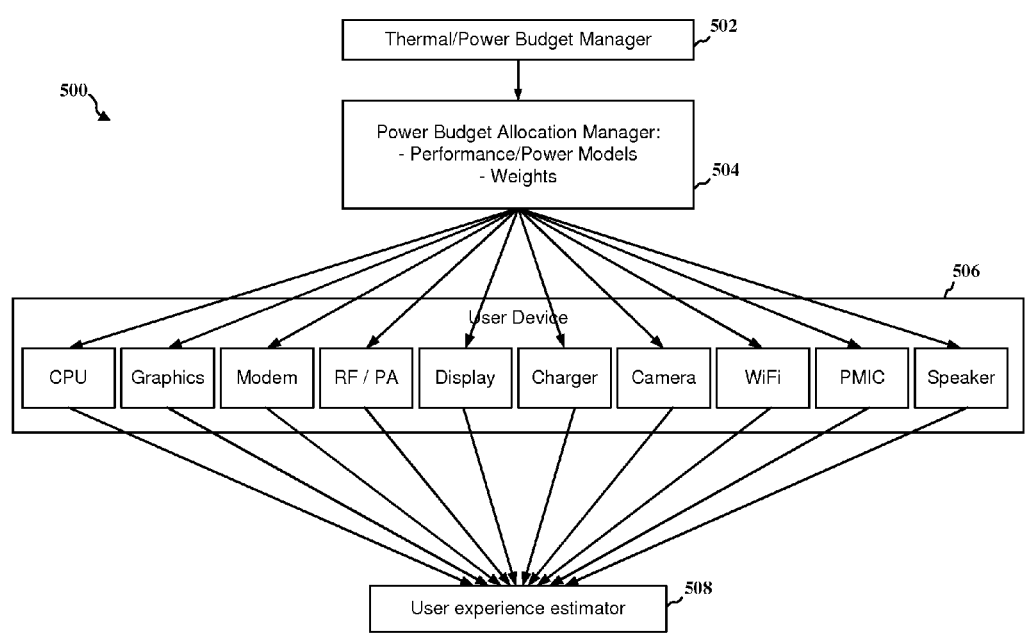
FIG. 5 is a diagram illustrating a thermal power budget allocation system.

FIG. 5 is a diagram illustrating a power control system 500. The control system 500 includes a thermal/power budget manager 502 and a power budget allocation manager 504. The power budget allocation manager 504 corresponds to the power supply controller 204 in FIG. 2. The control system 500 also includes a user experience estimator 508 that provides a measure of overall user device performance.

The thermal/power budget manager 502 determines the total amount of power available for allocation based on the current temperature of the user device and the current power consumption of the user device, using well known techniques. The current temperature may include one or more of the junction temperature ($T_j$) of the device, as defined above; the case/skin temperature ($T_{case}$), as defined above, or the temperature of ambient air ($T_a$) in the vicinity of the user device. For example, in colder climates, where ambient temperature is low, the budget may increase. An exemplary total power budget for a small form factor user device, such as a Smartphone is in the range of 2000-3000 mW.

The power budget allocation manager 504 allocates power based on the total power budget determined by the thermal power budget manager 502 and one or more of component priorities derived from the performance/power models of user-device components and optionally, component weights corresponding to one or more usage scenarios. The power budget allocation manager 504 includes or has access to performance/power models for each device. These are the models described above and include the model/setting/parameters of (1) minimum power required to keep the component turned on and (2) increasing or diminishing performance return on incremental power allocation, as provided by the shape of the model, including in particular, the slopes.

Figure 6:
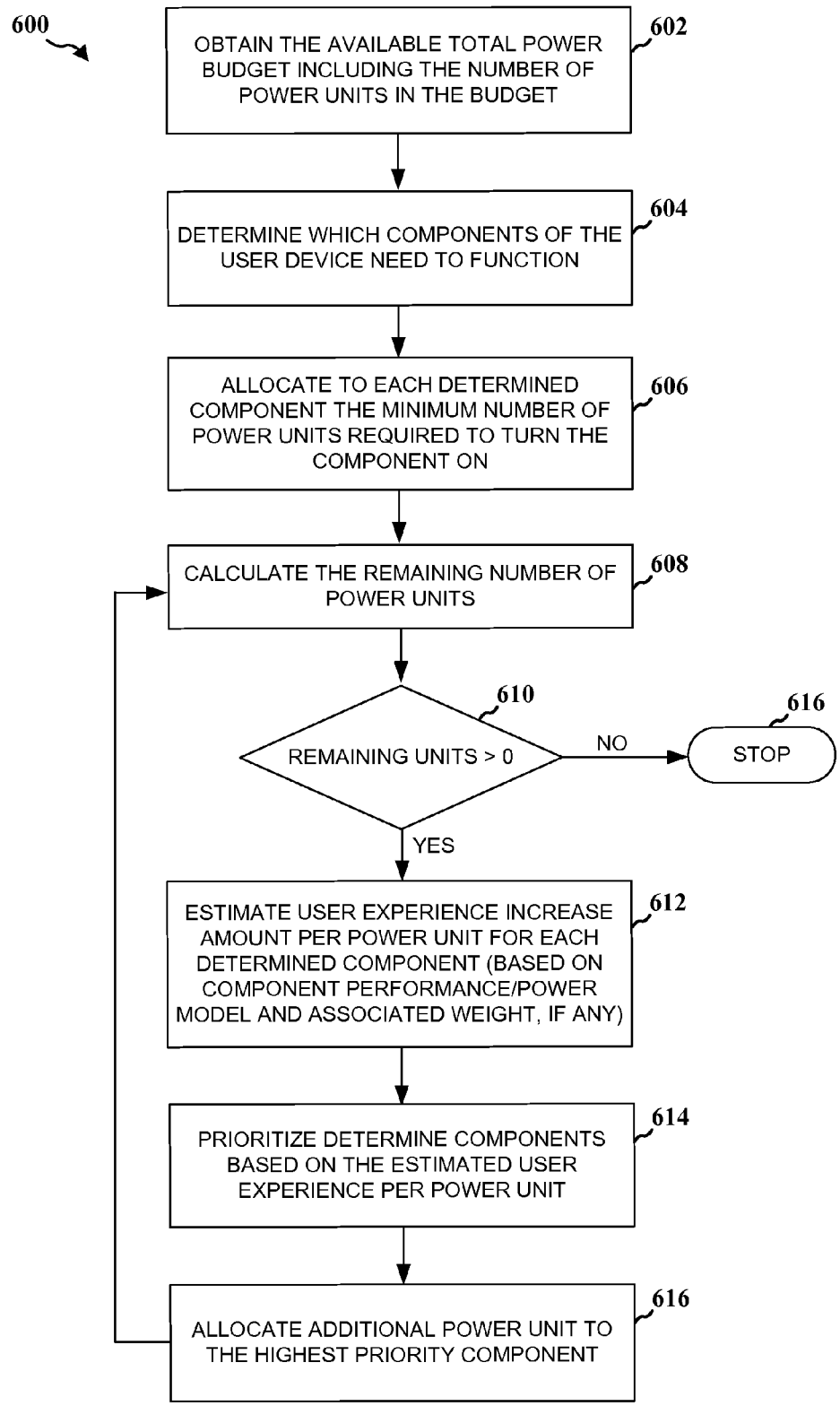
FIG. 6 is a flow chart of a method of allocating power among a number of user-device components.

FIG. 6 is a flow chart of a method of allocating power among a number of user-device components. The method may be implemented by the power budget allocation manager 504. At step 602, the available total power budget and number of power units is obtained, for example, from the thermal/power budget manager 502. The total power budget is defined by the size of the device and material of the case. A total power budget for a Smartphone may be, for example, between 2000 mW to 3000 mW, where power is allocated in 100 mW units or portions.

At step 604, the power budget allocation manager 504 determines which components of the user device need to function. In some cases, all components may need to function. In other cases, a device usage scenario and associated weights may limit the number of components that need to function. For example, if a usage scenario assigns a weight of zero to a particular component than that component does not need to be powered on. At step 606, the power budget allocation manager allocates to each determined component the minimum number of power units required to turn the component on.

At step 608, the power budget allocation manager calculates the remaining number of power units. This calculation is simply the difference between the total number of units in the total power budget and the number of units already allocated.

At step 610, the power budget allocation manager determines if there are any units of power remaining for allocation. If there are no units, then the process stops at step 616. If power units are still available, then the process proceeds to step 612 where the power budget allocation manager estimates a user-experience increase amount per power unit for each component, based on the particular component performance/power model and associated weight, if any. At step 614, the power budget allocation manger prioritizes the components based on the estimated user experience increase per power unit.

Prioritization is based on measures obtained from power performance models. In one configuration, the measure is a rate of attribute change as a function of power consumption for the component. These measures correspond to slopes on the models, such as those shown in FIGS. 4A-4F. A slope (see Eq. 2 above) may be obtained as a change in attribute over the change in power consumption, where the change attribute is the difference between the current attribute and what the new attribute would be if power consumption were increased, and the change in power is the difference between the current power consumption and the new power consumption if it were increased. Once the measure for each of the components is obtained, the components are prioritized in order from the largest measure to the smallest measure. In one configuration, a component may be removed from the priority order if its measure does not satisfy a minimum threshold. The minimum threshold may be a slope value corresponding to a region of the component model where an increase in power allocation to the component will be a good return on investment. Slope values above the minimum threshold would be good returns on investment, while slopes below the threshold would not. For example, slopes below the minimum threshold may correspond to flat regions of the models.

In another configuration, weights are associated with one or more of the components and the measure comprises a weighted rate-of-attribute change. In this case, a rate of change measure is obtained as described above and then multiplied by a weight. The components are then prioritized in order from the largest measure to the smallest measure.

At step 616, the power budget allocation manager allocates additional power unit to the highest priority component and the process returns to step 608. The process loop formed by steps 608, 610, 612, 614 and 616 is repeated until the total amount of power allocated equals the total power budget.

In cases where power reduction is in order, the power budget allocation manager 504 may reallocate power. For example, when the entire power budget has been allocated and a particular component needs more power, the power budget allocation manger 504 may reduce the power supplied to another component and reallocate it to the particular component that needs it. Such reallocation may involve applying the priority order described above in reverse order, so that power is removed from the component having the smallest measure and reapplied to the particular component needing more power.

Returning to FIG. 5, the power control system 500 also includes a user experience estimator 508. The user experience estimator 508 provides a measure of overall device performance for a given power budget allocation. The measure is a weighted sum of component performances as follows:

$$\text{User Experience} \approx \text{Overall System Performance} \approx \Sigma (\text{Weighting}_i \times (\text{Performance}_i / \text{Performance}_{demand})) \quad \text{Eq. 3}$$

where:
 Weighting$_i$=the weight assigned to component i
 Performance$_i$=actual performance of component i at the current power consumption of the component.
 Performance$_{demand}$=ideal performance of component i.

Weighting is a constant number associated with each component. For example, a CPU may have a weight of 1, a GPU a weight of 0.8, and an transmitter a weight of 0.6. These weights are predefined constants provided by the component OEM and may or may not be the same weights that are used to prioritize components for power allocation, as described. Regarding the performance parameters, if the ideal performance for a display is a brightness of 400 Nits and the actual performance is at 200 Nits, then the display is performing at 50%. Likewise, if the ideal performance for the CPU is at 1 GHz and the actual performance is at 0.5 Ghz, then the CPU is performing at 50%.

Figure 7:
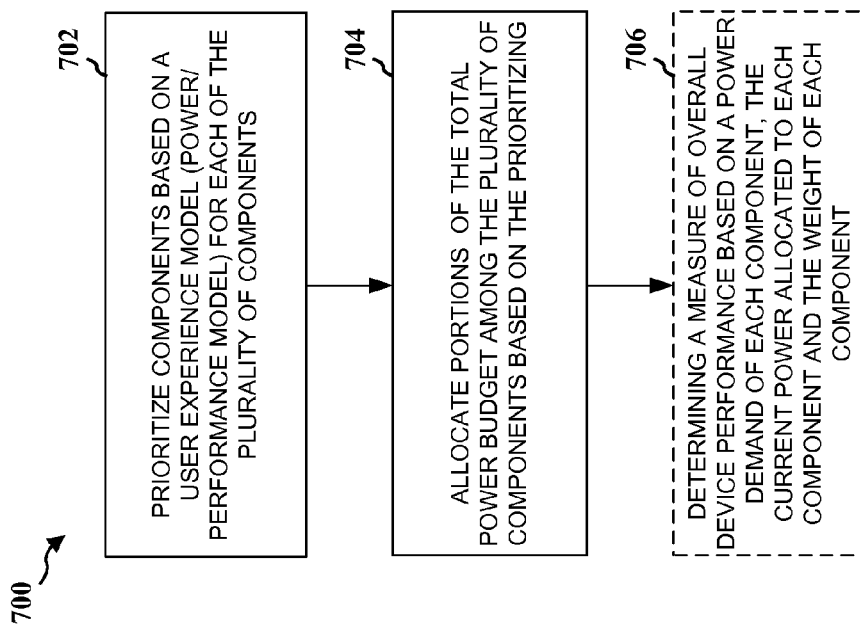
FIG. 7 is a general flow chart of a method of thermal power budget allocation.

FIG. 7 is a general flow chart of a method of thermal power budget allocation for a user device. At step 702, components of the user device are prioritized based on a performance/power model for each of the components. The performance/power model of a component includes a measure of component attribute as a function of component power consumption. The performance/power models and associated measures are as described above with reference to FIGS. 4 and 6.

At step 704, portions of the total power budget are allocated among the plurality of components based on the prioritizing, as described in detail above with reference to FIG. 6. At step 706, a measure of overall device performance is optionally determined based on a power demand of each component, the current power allocated to each component and the weight of each component. This measure may be the summation described above with reference to FIG. 5 and Eq. 3.

Figure 8:
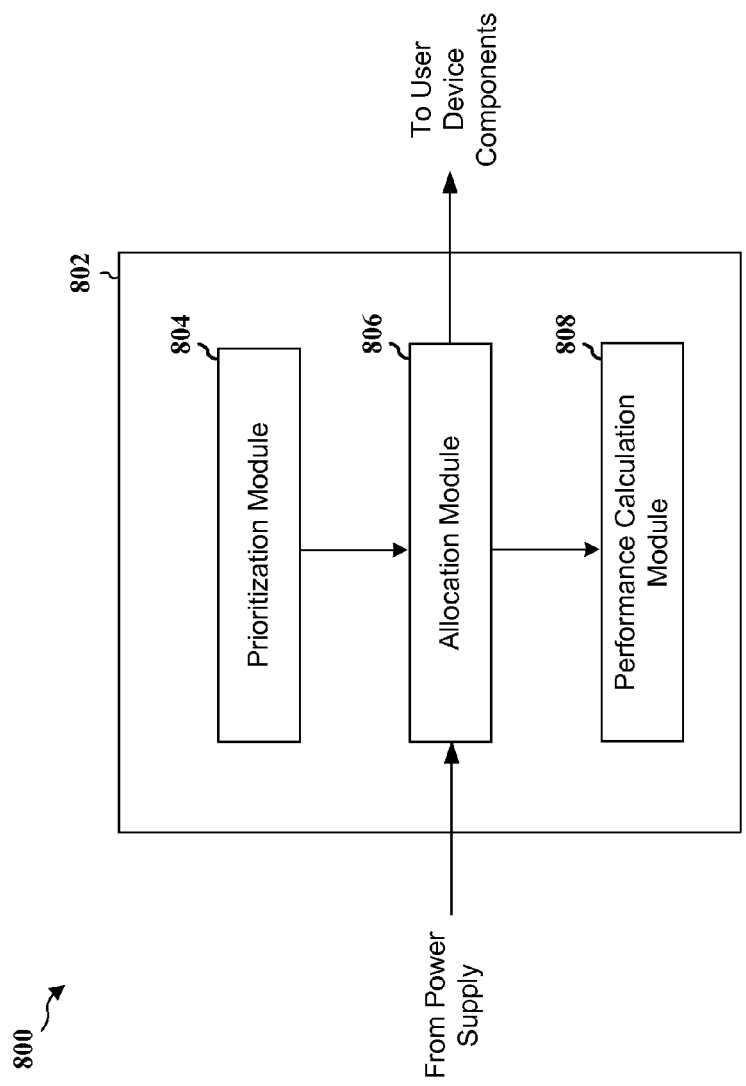
FIG. 8 is a conceptual data flow diagram illustrating the data flow between different modules/means/components in an exemplary thermal power budget allocation apparatus.

FIG. 8 is a conceptual data flow diagram 800 illustrating the data flow between different modules/means/components in an exemplary thermal power budget allocation apparatus 802. The apparatus includes a prioritization module 804 that prioritizes components of a user device based on a performance/power model for each of the components. As noted above, the performance/power model of a component includes a measure of component attribute as a function of component power consumption. The apparatus 802 also includes an allocation module 806 that allocates portions of the total power budget among the components based on component priority, as described in detail above with reference to FIG. 6. The apparatus may also include an overall performance calculation module 808 that determines a measure of overall device performance based on a power demand of each component, the current power allocated to each component and a weight of each component.

The apparatus may include additional modules that perform each of the steps of the algorithm in the aforementioned flow charts of FIGS. 6 and 7. As such, each step in the aforementioned flow charts of FIGS. 6 and 7 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 9:
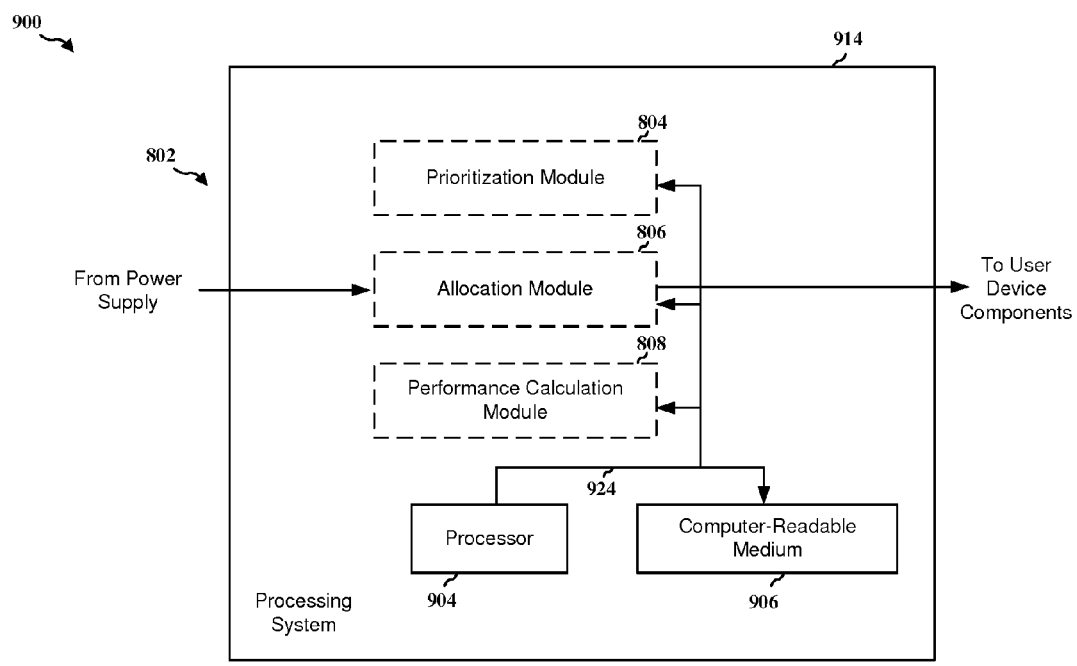
FIG. 9 is a diagram illustrating an example of a hardware implementation for a thermal power budget allocation apparatus employing a processing system.

FIG. 9 is a diagram 900 illustrating an example of a hardware implementation for a thermal power budget allocation apparatus 802 employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 904, the modules 804, 806, 808 and the computer-readable medium 906. The bus 924 may also link various other circuits such as timing sources, peripherals, voltage regulators, and power management circuits, which are well known in the art, and therefore, will not be described any further.

The processing system 914 includes a processor 904 coupled to a computer-readable medium 906. The processor 904 is responsible for general processing, including the execution of software stored on the computer-readable medium 906. The software, when executed by the processor 904, causes the processing system 914 to perform the various functions described supra for any particular apparatus. The computer-readable medium 906 may also be used for storing data that is manipulated by the processor 904 when executing software. The processing system further includes at least one of the modules 804, 806 and 808. The modules may be software modules running in the processor 904, resident/stored in the computer readable medium 906, one or more hardware modules coupled to the processor 904, or some combination thereof.

In one configuration, the apparatus 802/802' for managing power budget allocation includes means for prioritizing components of a user device based on a performance/power model for each of the components, wherein the performance/power model of a component includes a measure of component attribute as a function of component power consumption. The apparatus 802/802' also includes means for allocating portions of the total power budget among the plurality of components based on component priority. The apparatus 802/802' may also include means for determining a measure of overall device performance based on a power demand of each component, the current power allocated to each component and a weight of each component. The aforementioned means may be one or more of the aforementioned modules of the apparatus 802 and/or the processing system 914 of the apparatus 802' configured to perform the functions recited by the aforementioned means.

This above described power budget scheme can be expanded to the instantaneous peak current limiting and management. In this configuration a total peak current budget is determined and then allocated to each component based on performance/current models similar to the performance/power models above. This protects the battery or power supply from over-current damage in case several components are running heavy workload and there is a chance for the instantaneous current go beyond the current supply capability of battery or power supply.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of allocating a total power budget among a plurality of components of a user device, said method comprising:
    prioritizing the plurality of components based on a performance/power model for each of the plurality of components, wherein the performance/power model of a component of the plurality of components is defined by a plurality of measures of an attribute of the component of the plurality of components as a function of a corresponding plurality of power consumption values, and wherein the prioritizing comprises determining a rate of change for each of the plurality of components based on a difference between a current power consumption value and an increased power consumption value, and a difference between a measure of the attribute corresponding to the current power consumption value and a measure of the attribute corresponding to the increased power consumption value;
    allocating portions of the total power budget among the plurality of components based on the prioritizing by allocating a first portion to a component of the plurality of components having a largest rate of change; and
    repeating the prioritizing and allocating for a next portion of power.

2. The method of claim 1, wherein the prioritizing the plurality of components further comprises determining a priority for the plurality of components in order from the largest rate of change to a smallest rate of change.

3. The method of claim 1, wherein a weight is associated with the component of the plurality of components and determining the rate of change for the component of the plurality of components comprises applying the weight to the determined rate of change for the component of the plurality of components to obtain a weighted rate of change.

4. The method of claim 3, wherein the weight of the component of the plurality of components is determined by monitoring one or more of a pattern of usage of the component, frequency of usage of the component, context of usage of the component, location of usage of the component or time of usage of the component.

5. The method of claim 3, wherein the weight of the component of the plurality of components is predefined for the user device.

6. The method of claim 2, further comprising removing the component of the plurality of components from the priority if its rate of change does not satisfy a minimum threshold.

7. The method of claim 2, wherein the allocating the portions of the total power budget comprises allocating to one or more of the plurality of components, a portion of power required to turn on the component of the plurality of components, wherein such allocation occurs prior to allocating the first portion to the component having the largest rate of change.

8. The method of claim 2, wherein allocating portions of the total power budget power further comprises reducing power to the plurality of components in a reverse order that is reverse to the order of the priority.

9. The method of claim 2, further comprising determining a measure of overall device performance based on a power demand of each component of the plurality of components, a current power allocated to each component of the plurality of components and a weight of each component of the plurality of components.

10. An apparatus for allocating a total power budget among a plurality of components of a user device, said apparatus comprising:
    means for prioritizing the plurality of components based on a performance/power model for each of the plurality of components, wherein the performance/power model of a component of the plurality of components is defined by a plurality of measures of attribute of the component of the plurality of components as a function of a corresponding plurality of power consumption values, and wherein the means for prioritizing is configured to determine a rate of change for each of the plurality of components based on a difference between a current power consumption value and an increased power consumption value, and a difference between a measure of the attribute corresponding to the current power consumption value and a measure of the attribute corresponding to the increased power consumption value;
    means for allocating portions of the total power budget among the plurality of components based on priority by allocating a first portion to a component of the plurality of components having a largest rate of change; and
    means for repeating the prioritizing and allocating for a next portion of power.

11. The apparatus of claim 10, wherein the means for prioritizing the plurality of components is configured to determine a priority for the plurality of components in order from the largest rate of change to a smallest rate of change.

12. The apparatus of claim 10, wherein a weight is associated with the component of the plurality of components and the means for prioritizing the plurality of components is configured to determine the rate of change for the component of the plurality of components by applying the weight to the determined rate of change for the component of the plurality of components to obtain a weighted rate of change.

13. The apparatus of claim 12, wherein the weight of the component of the plurality of components is determined by means configured to monitor one or more of a pattern of usage of the component, frequency of usage of the component, context of usage of the component, location of usage of the component or time of usage of the component.

14. The apparatus of claim 12, wherein the weight of the component of the plurality of components is predefined for the user device.

15. The apparatus of claim 11, wherein the means for prioritizing is further configured to remove the component of the plurality of components from the priority if its rate of change does not satisfy a minimum threshold.

16. The apparatus of claim 11, wherein the means for allocating the portions of the total power budget is configured to allocate to one or more of the plurality of components, a portion of power required to turn on the component of the plurality of components, wherein such allocation occurs prior to allocation of the first portion to the component having the largest rate of change.

17. The apparatus of claim 11, wherein the means for allocating portions of the total power budget power is configured to reduce power to the plurality of components in a reverse order that is reverse to the order of the priority.

18. The apparatus of claim 11, further comprising means for determining a measure of overall device performance, wherein the means for determining is configured to sum a plurality of individual performance measures, each individual performance measure being a function of a power demand for each component of the plurality of components, a current power allocated to each component of the plurality of components and a weight of each component of the plurality of components.

19. An apparatus for allocating a total power budget among a plurality of components of a user device, said apparatus comprising:
a memory; and
at least one processor coupled to the memory and configured to:
prioritize the plurality of components based on a performance/power model for each of the plurality of components, wherein the performance/power model of a component of the plurality of components is defined by a plurality of measures of an attribute of the component of the plurality of components as a function of a corresponding plurality of power consumption values, and wherein the at least one processor prioritizes by being further configured to determine a rate of change for each of the plurality of components based on a difference between a current power consumption value and an increased power consumption value, and a difference between a measure of the attribute corresponding to the current power consumption value and a measure of the attribute corresponding to the increased power consumption value;
allocate portions of the total power budget among the plurality of components based on priority, wherein the at least one processor is further configured to allocate a first portion to a component of the plurality of components having a largest rate of change; and
repeat the prioritizing and allocating for a next portion of power.

20. The apparatus of claim 19, wherein the at least one processor is configured to determine a priority for the plurality of components in order from the largest rate of change to a smallest rate of change.

21. The apparatus of claim 10, wherein a weight is associated with the component of the plurality of components and the at least one processor is configured to determine the rate of change for the component of the plurality of components by applying the weight to the determined rate of change for the component of the plurality of components to obtain a weighted rate of change.

22. The apparatus of claim 21, wherein the at least one processor is configured to determine the weight of the component of the plurality of components by being further configured to monitor one or more of a pattern of usage of the component, frequency of usage of the component, context of usage of the component, location of usage of the component or time of usage of the component.

23. The apparatus of claim 21, wherein the weight of the component of the plurality of components is predefined for the user device.

24. The apparatus of claim 20, wherein the at least one processor is further configured to remove the component of the plurality of components from the priority if its rate of change does not satisfy a minimum threshold.

25. The apparatus of claim 20, wherein the at least one processor is configured to allocate to one or more of the plurality of components, a portion of power required to turn on the component of the plurality of components, wherein such allocation occurs prior to allocation of the first portion to the component having the largest rate of change.

26. The apparatus of claim 20, wherein the at least one processor is configured to reduce power to the plurality of components in a reverse order that is reverse to the order of the priority.

27. The apparatus of claim 20, wherein the at least one processor is configured to determine a measure of overall device performance by being configured to sum a plurality of individual performance measures, each individual performance measure being a function of a power demand for each component of the plurality of components, a current power allocated to each component of the plurality of components and a weight of each component of the plurality of components.

28. A non-transitory computer-readable medium storing computer executable code for allocating a total power budget among a plurality of components of a user device, comprising code for:
prioritizing the plurality of components based on a performance/power model for each of the plurality of components, wherein the performance/power model of a component of the plurality of components is defined by a plurality of measures of an attribute of the component of the plurality of components as a function of a corresponding plurality of power consumption values, and wherein the prioritizing comprises determining a rate of change for each of the plurality of components based on a difference between a current power consumption value and an increased power consumption value, and a difference between a measure of the attribute corresponding to the current power consumption value and a measure of the attribute corresponding to the increased power consumption value;
allocating portions of the total power budget among the plurality of components based on the prioritizing by allocating a first portion to a component of the plurality of components having a largest rate of change; and
repeating the prioritizing and allocating for a next portion of power.

29. The non-transitory computer-readable medium of claim 28, further comprising code for determining a priority for the plurality of components in order from the largest rate of change to a smallest rate of change.

30. The non-transitory computer-readable medium of claim 28, wherein a weight is associated with the component of the plurality of components and further comprising code for applying the weight to the determined rate of change for the component of the plurality of components to obtain a weighted rate of change.

31. The non-transitory computer-readable medium of claim 30, comprising code for determining the weight of the component of the plurality of components by monitoring one or more of a pattern of usage of the component, frequency of usage of the component, context of usage of the component, location of usage of the component or time of usage of the component.

32. The non-transitory computer-readable medium of claim 30, wherein the weight of the component of the plurality of components is predefined for the user device.

33. The non-transitory computer-readable medium of claim 29, comprising code for removing the component of the plurality of components from the priority if its rate of change does not satisfy a minimum threshold.

34. The non-transitory computer-readable medium of claim 29, comprising code for allocating to one or more of the plurality of components, a portion of power required to turn on the component of the plurality of components, wherein such allocation occurs prior to allocating the first portion to the component having the largest rate of change.

35. The non-transitory computer-readable medium of claim 29, comprising code for reducing power to the plurality of components in a reverse order that is reverse to the order of the priority.

36. The non-transitory computer-readable medium of claim 29, comprising code for determining a measure of overall device performance based on a power demand of each component of the plurality of components, a current power allocated to each component of the plurality of components and a weight of each component of the plurality of components.

37. A method of allocating a total current budget among a plurality of components of a user device, said method comprising:
  prioritizing the plurality of components based on a performance/current model for each of the plurality of components, wherein the performance/current model of a component of the plurality of components is defined by a plurality of measures of an attribute of the component of the plurality of components as a function of a corresponding plurality of current consumption values, and wherein the prioritizing comprises determining a rate of change for each of the plurality of components based on a difference between a current power consumption value and an increased power consumption value, and a difference between a measure of the attribute corresponding to the current power consumption value and a measure of the attribute corresponding to the increased power consumption value;
  allocating portions of the total current budget among the plurality of components based on the prioritizing by allocating a first portion to a component of the plurality of components having the largest rate of change; and
  repeating the prioritizing and allocating for a next portion of current.

* * * * *